United States Patent [19]
Aoki et al.

[11] Patent Number: 4,764,821
[45] Date of Patent: Aug. 16, 1988

[54] CASSETTE TYPE RECORDING APPARATUS

[75] Inventors: Reiko Aoki; Yoshie Noborimoto; Yoko Funatsu, all of Tokyo; Shinichi Konno, Kanagawa, all of Japan

[73] Assignee: Sony Corporation, Tokyo, Japan

[21] Appl. No.: 942,817

[22] Filed: Dec. 17, 1986

[30] Foreign Application Priority Data

Dec. 27, 1985 [JP] Japan .......................... 60-201047[U]

[51] Int. Cl.[4] ............................................. H04N 5/782
[52] U.S. Cl. ..................................... 360/33.1; 360/31; 360/85; 360/137; 360/60; 369/53; 358/335
[58] Field of Search ............... 360/33.1, 31, 85, 137, 360/60; 369/53, 79; 358/335; 242/199, 198, 197

[56] References Cited
U.S. PATENT DOCUMENTS 3,218,076 11/1965 Wolfner ............................ 369/79
4,011,586 3/1977 Pastor .............................. 360/31
4,206,483 6/1980 Nakamura ....................... 360/33.1
4,242,540 12/1980 Tranchi ............................ 360/31
4,325,081 4/1982 Abe ................................. 360/33.1
4,580,183 4/1986 Maeda ............................. 360/85

Primary Examiner—Alan Faber
Attorney, Agent, or Firm—Hill, Van Santen, Steadman & Simpson

[57] ABSTRACT

A cassette type recording apparatus is disclosed, in which a signal indicative of executing the timer-activated recording and a signal indicating whether or not a tape cassette is inserted into a cassette compartment are identified so that when the timer-activated recording is to be carried out, if the tape cassette is not inserted into the cassette compartment, a cassette compartment lid is opened thus to prevent the mis-operation upon timer-activated recording and the cassette type recording apparatus can be utilized more effectively.

4 Claims, 3 Drawing Sheets

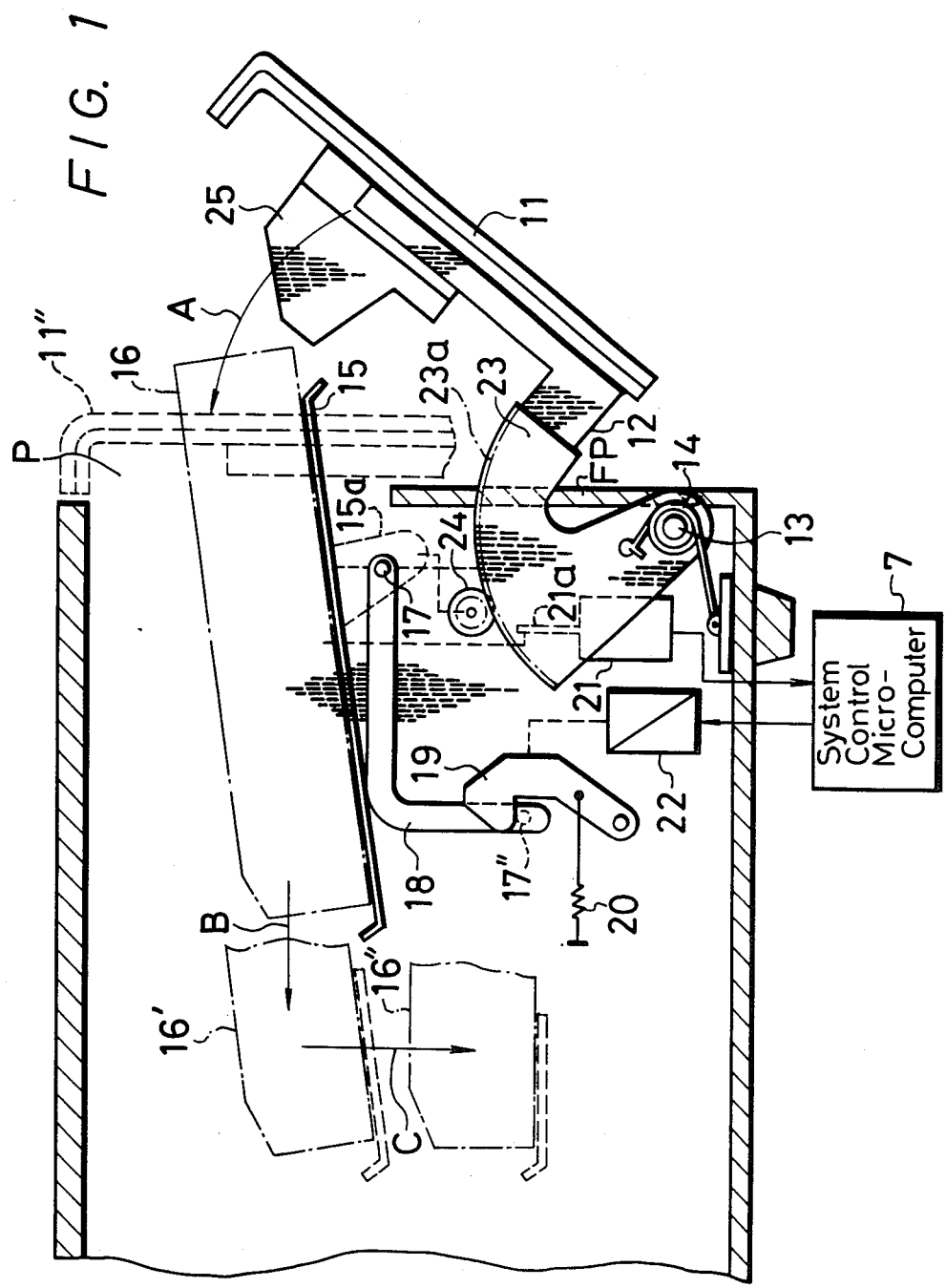

CASSETTE TYPE RECORDING APPARATUS

BACKGROUND OF THE INVENTION

1. Field of the Invention

The present invention relates generally to a cassette type tape recorder and, more particularly, is directed to a cassette type recording apparatus which has timer-activated functions.

2. Description of the Prior Art

There is known a cassette type tape recorder having timer-activated functions. In such cassette type tape recorder, it is very difficult to check to see if a tape cassette is inserted into the cassette compartment thereof from the outside of the tape recorder. So, there is a serious risk that a timer-activated recording will be failed when the timer-activated recording is set while the tape cassette is not inserted into the cassette compartment.

Therefore, in the prior art cassette type recording apparatus of this kind, if a user sets the timer-activated functions while the tape cassette is not inserted into the cassette compartment, the indication of, for example, "TIMER REC" does not light up so that the user is warned so as to confirm that the tape cassette is not inserted into the cassette compartment. In this case, however, the user frequently fails to confirm the indication of "TIMER REC" and the indication of "TIMER REC" is too feeble to attract the attention of the user. Thus, a serious risk of mis-operation still remains unsolved.

As described above, in the prior art technology, when the timer-activated functions are set while the tape cassette is not inserted into the cassette compartment, the warning to let the user to see that the tape cassette is not inserted into the cassette compartment is not so sufficiently powerful. There is then a defect that a mis-operation in the timer-activated recording will occur easily.

OBJECTS AND SUMMARY OF THE INVENTION

Accordingly, it is a general object of this invention to provide an improved cassette type recording apparatus.

An object of this invention is to provide a cassette type recording apparatus which can reduce a risk of mis-operation considerably.

Another object of this invention is to provide a cassette type recording apparatus which has various kinds of timer-activated recording functions.

Further object of this invention is to provide a cassette type recording apparatus suitably applied to a cassette type video tape recorder.

According to one aspect of the present invention, there is provided a cassette type recording apparatus in which a tape cassette is inserted into a cassette compartment and a cassette compartment lid is closed to load a magnetic tape from said tape cassette thus a recording and/or reproducing becomes possible comprising:
(a) lock lever means for locking said cassette compartment lid;
(b) timer programming means;
(c) system control circuit means supplied with a first signal indicative of carrying out a timer-activated recording from said timer programming means;
(d) means for detecting that said tape cassette is inserted into said tape cassette compartment and for supplying a second signal to said system control circuit means; and
(e) means for generating a third signal which releases a locking state of said lock lever means for said cassette compartment lid by said system control circuit means if said second signal is absent when said first signal is supplied to said system control circuit means.

These and other objects, features and advantages of the present invention will be apparent from the following detailed description of the preferred embodiment of the invention that is to be read in conjunction with the accompanying drawings, in which like reference numerals identify like elements and parts in the several views.

BRIEF DESCRIPTION OF THE DRAWINGS

FIG. 1 is a cross-sectional view illustrating an example of a cassette type tape recorder to which the present invention is applied;

DESCRIPTION OF THE PREFERRED EMBODIMENT

Figure 2A:
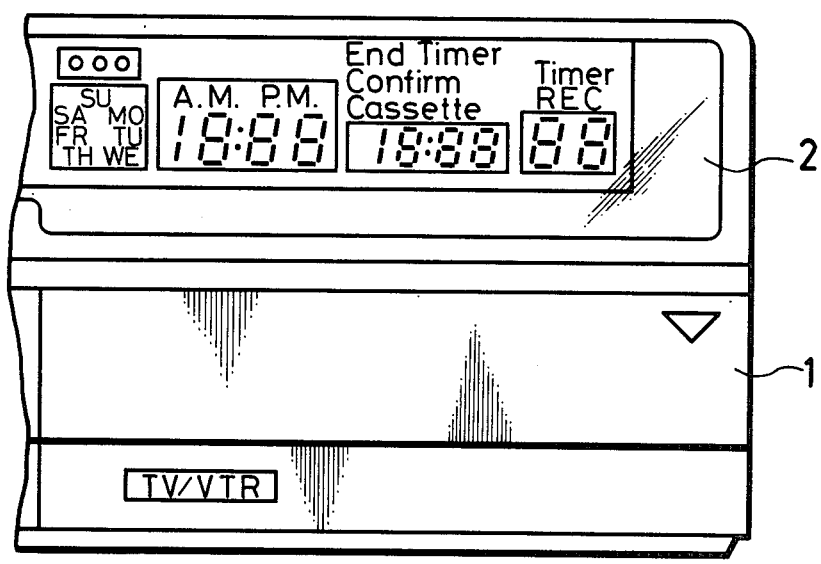
FIGS. 2A and 2B are front views of main portions of the cassette type tape recorder used to explain the timer programming functions, respectively.

Now, an embodiment of a cassette type recording apparatus, particularly, a system controller for timer programming according to the present invention will hereinafter be described with reference to the attached drawings.

FIG. 1 is a schematic representation of a cassette compartment of a cassette type tape recorder to which the present invention is applied.

Referring to FIG. 1, a cassette compartment lid 11 is provided to open and/or close a cassette insertion opening P that is formed through a front panel FP of this cassette type tape recorder. This cassette compartment lid 11 is coupled through a coupling portion 12 to a rotary shaft 13 so as to be openable and/or closable and also biased in the openable direction by the spring force or biasing force of a spring 14 which is wound around the rotary shaft 13. The cassette compartment lid 11 is further coupled through the afore-mentioned coupling portion 12 to a link mechanism (not shown). So, when a tape cassette 16 is inserted into the cassette compartment, various kinds of operations are carried out in response to the rotary movement of the cassette compartment lid 11. A cassette holder 15 is adapted to hold thereon the tape cassette 16. Although not explained in detail, this cassette holder 15 is moved as the cassette compartment lid 11 is opened and/or closed.

The cassette holder 15 is moved as a pin 17 provided on one portion of the link mechanism (not shown) is moved along a guide groove 18 formed through a chassis (not shown). When the cassette compartment lid 11 is closed or rotated in the direction shown by an arrow A, the cassette holder 15 is drawn inside as shown by an arrow B, moved to the position of a tape cassette 16' and then lowered from the position of the tape cassette 16' to the position of a tape cassette 16" as shown by an arrow C. Thus, the tape cassette 16 is brought to the so-called loading position. Since the tape cassette 16 becomes capable of the recording at the position of the tape cassette 16", from the outside of the cassette compartment lid 11, the user can not check to see if the tape cassette 16 is inserted into the cassette compartment. Under this condition, when the pin 17 is engaged with a lock lever 19 at the position of a pin 17", as earlier noted, the cassette holder 15 is moved and located at the position of the tape cassette 16" as shown by the arrows B and C and the cassette compartment lid 11 is rotated in the direction shown by the arrow A against the biasing force of the spring 14 or the like. Thus, the cassette compartment lid 11 is held in the state of a cassette compartment lid 11", or the casssette compartment lid 11 is closed. The lock lever 19 is biased by the biasing force of a spring 20 so as to hold the pin 17 at the position of 17".

Further, there is provided a micro-switch 21 that is used to check whether or not the tape cassette 16 is inserted into the cassette compartment. When the tape cassette 16 is held on the cassette holder 15 and the cassette compartment lid 11 is closed at the position of the cassette compartment lid 11", a projected portion 21a of the micro-switch 21 is pressed by a cassette detection lever or the like (not shown) and then the micro-switch 21 generates a detection signal. The detection signal from the micro-switch 21 is supplied to a system control micro-computer 7. A rotary gear 24 is rotated by a gear portion 23a formed on the upper edge portion of a base portion 23 of the cassette compartment lid 11. Accordingly, when the rotary gear 24 is rotated, a pin reception portion 15a of the cassette holder 15 for the pin 17 is moved in synchronism with the rotation of the rotary gear 24 by a link mechanism (not shown).

Further, there is provided a plunger 22 that is operated by an output signal from the system control micro-computer 7 so as to disengage the pin 17 and the lock lever 19. The tape cassette 16 is pushed by a cassette pushing portion 26 formed on the inside of the cassette compartment lid 11 integrally therewith. In FIG. 1, broken lines mean that the respective parts of this cassette type tape recorder are operated in a ganged fashion from a mechanics standpoint.

Accordingly, in this cassette type tape recorder, when the cassette compartment lid 11 is closed, or the cassette compartment lid 11 is located at the position of the cassette compartment lid 11", the cassette holder 15 is drawn inside as shown by the arrow B and the pin 17 is locked by the lock lever 19 so that the cassette holder 15 is located at the position of the tape cassette 16" as shown by the arrow C. At that time, when the tape cassette 16 exists in the cassette compartment, the detection signal is generated from the micro-switch 21. Upon eject mode, when the plunger 22 is driven by the output signal from the system control micro-computer 7, the engagement between the lock lever 19 and the pin 17 is broken and thus the cassette compartment lid 11 is opened by the spring 14.

Figure 2B:
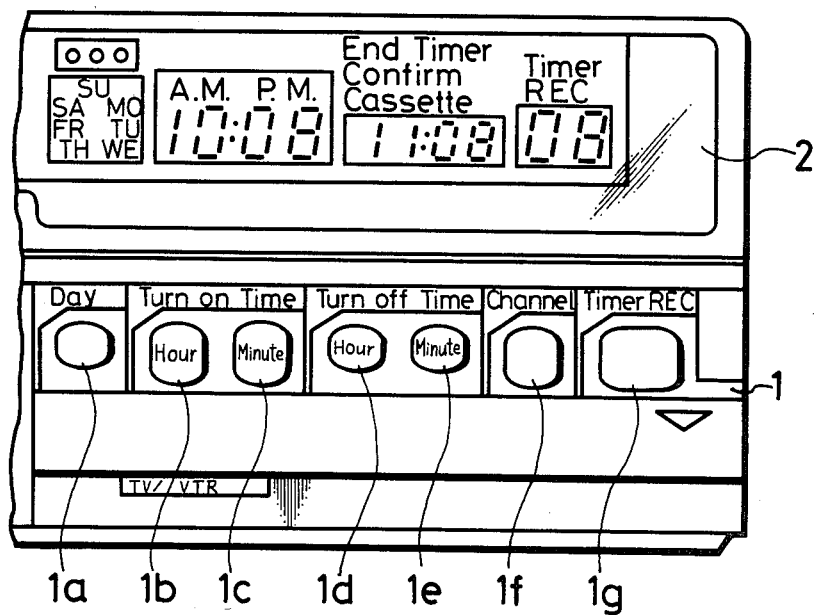

FIGS. 2A and 2B are front views of main portions of this cassette type tape recorder in which various kinds of timer-activated functions can be set and the timer function settings can be displayed, respectively. FIG. 2A illustrates a state that an operation portion 1 for setting the timer programming is closed and hence is not exposed. Under this state, a current time, for example, is displayed on an indication panel portion 2.

Further, the operation portion 1 is made rotatable to the housing of this cassette type tape recorder so that the operation portion 1 is made reclinable forward to oppose the front on the sheet of drawing by an arbitrary operation done by the user and thereby the operation portion 1 is exposed. While, FIG. 2B illustrates a state that the operation portion 1 is exposed. In the illustrated state, push buttons 1a to 1g for setting the timer programming are exposed and the indications corresponding to the contents of the timer settings are made on the indication panel portion 2. As shown in FIG. 2B, all display elements on the indication panel portion 2 light up.

The respective push buttons 1a to 1g will be explained more fully.

In the operation portion 1, the push button 1a is used to set a day of the week. When this push button 1a is pressed, the indication of the day of the week set at the current time or the time previously set is changed on the time indication panel portion 2 in the sequential order from "Sunday" to "Saturday" which are displayed in a circular fashion on the timer indication panel portion 2 directly above. The push button 1b is used to set "hour" of the timer recording start time or timer turn-on time. When this push button 1b is pressed, the indication of "1" to "12" and "A.M. and "P.M." on the timer indication panel portion 2 directly above are changed sequentially. The push button 1c is used to set "minute" of the timer turn-on time. When this push button 1c is pressed, the indication of "00" to "59" on the timer indication panel portion 2 directly above is changed sequentially. The push buttons 1d and 1e are used to set "hour" and "minute" of the timer recording end time, respectively. When the push buttons 1d and 1e are pressed, the indications of "1" to "12" and "00" to "59" on the timer indication panel portion 2 are changed sequentially. Further, the push button 1f is used to set the channel number. When this push button 1f is pressed, the indication of "00" to "99" on the timer indication panel portion 2 just above the button 1f is changed sequentially. The push button 1g is used to set and reset the timer-activated recording. When this push button 1g is pressed, if the user wants the timer recording, the indication of "TIMER REC" lights up on the timer indication panel portion 2, while if not, the indication "TIMER REC" goes off.

Accordingly, in the cassette type tape recorder, when the push buttons 1a to 1f are pressed under the condition that the operation portion 1 is exposed, the day of the week, the timer turn-on time, the timer turn-off time and the television channel of the timer recording are set, respectively. Thereafter, when the push button 1g is pressed, the cassette type tape recorder is placed in the timer-activated recording mode and "TIMER REC" is displayed on the timer indication panel portion 2. In the timer-activated recording mode, the push buttons 1a to 1f except the push button 1g are made inoperative. When the timer settings are altered, the push button 1g is pressed once so as to reset the timer-activated recording mode and then the timer settings are altered.

Figure 3:
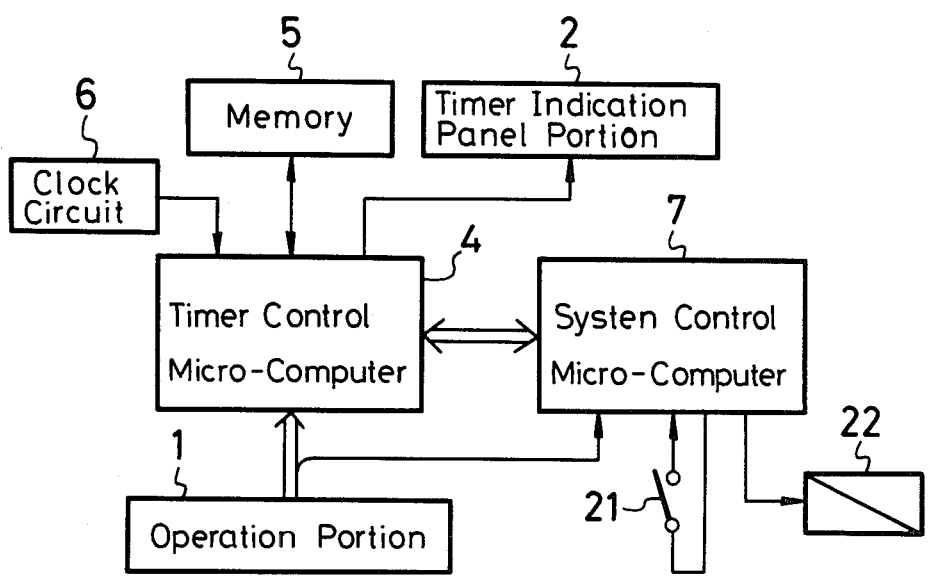
FIG. 3 is a block diagram of a construction of a system control circuit used to explain the operation of the present invention.

FIG. 3 is a block diagram showing a circuit arrangement of the system controller for the cassette type recording apparatus according to this invention. The signal from the operation portion 1 is supplied to a micro-computer 4 that is used to control the timer. The signal from the timer control micro-computer 4 is supplied to the timer indication panel portion 2. Under the condition that the operation portion 1 is exposed, when the push buttons 1a to 1f are pressed respectively, the contents of the timer programming thus set are latched in the timer control micro-computer 4 and then displayed on the timer indication panel portion 2. Further, the signal from the timer control micro-computer 4 is supplied to a memory 5. After the timer setttings are ended, if the push button 1g is depressed, the timer setting contents are stored in the memory 5 and the cassette type tape recorder is placed in the timer-activated recording mode.

The time signal from a clock circuit 6 is supplied to the timer control micro-computer 4 so that under the state that the operation portion 1 is closed, the time signal is supplied to the timer indication panel portion 2 and the current time is displayed thereon. Also, the time signal and the timer content retained in the memory 5 are compared with each other. When they coincide with each other, the control signal from the timer control micro-computer 4 is supplied to the system control micro-computer 7.

Further, in the cassette type tape recorder of this invention, when the cassette type tape recorder is placed in the timer-activated recording mode while the tape cassette 16 is not inserted into its cassette compartment, the system controller will be operated as follows.

Referring to FIG. 3, the signal indicating that the push button 1g is pressed is supplied from the operation portion 1 to the system control micro-computer 7 and the signal from the micro-switch 21 is supplied to the system control micro-computer 7. Further, the signal from the system control micro-computer 7 is supplied to the plunger 22.

Figure 4:
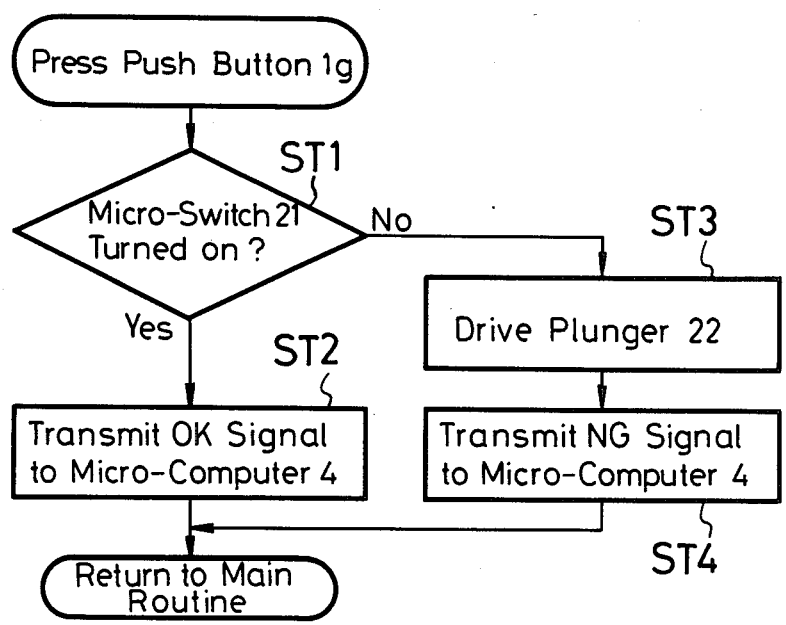
FIG. 4 is a flow chart to which reference will be made in explaining the operation of the present invention.

FIG. 4 is a flow chart of a sub routine of the program made by the system control micro-computer 7. When the push button 1g is pressed, this sub routine program is called. At step ST1, it is judged whether or not the micro-switch 21 generates the output. When the micro-switch 21 is turned on by the tape cassette 16, an OK signal is transmitted to the timer control micro-computer 4 at step ST2 and then the program returns to the main routine. When it is judged at step ST1 that the micro-switch 21 is turned off, the program goes to step ST3 and the plunger 22 is driven. At next step ST4, an NG signal is transmitted to the timer control micro-computer 4 and then the program returns to the main routine.

Accordingly, in this cassette type tape recorder, if it is placed in the timer-activated recording mode while the tape cassette 16 is not inserted into the cassette compartment thereof, the plunger 22 is driven by the output signal from the system control micro-computer 7 and the cassette compartment lid 11 is opened to thereby let the user to recognize that the tape cassette 16 is not inserted into the cassette compartment.

The timer programming is set in this way. According to the cassette type tape recorder according to the present invention, if the tape recorder is set in the timer-activated recording mode when the tape cassette 16 is not inserted into the cassette compartment thereof, the cassette compartment lid 11 is opened to clearly let the user to recognize that the tape cassette 16 is not inserted into the cassette compartment. Thus, it is possible to prevent the timer-activated recording from being failed because the tape cassette 16 is not inserted into the cassette compartment.

While the description is referred to the case in which the cassette compartment lid 11 is opened when the tape cassette 16 is not inserted into the cassette compartment, the cassette compartment lid 11 may be opened if it is detected that the recording is made impossible such as when the tape is wound out completely around a take-up reel (not shown), that is, the tape reaches its tape end, a tape cassette undergoes the mis-erase prevention treatment (the tab on the tape cassette is pulled out) and so on.

According to the present invention as set forth above, when the timer programming settings are made while the tape cassette is not inserted into the cassette compartment, the cassette compartment lid is opened to let the user to confirm that the tape cassette is not inserted into the cassette compartment. Thus, it becomes possible to considerably reduce a risk of the mis-operation.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. A cassette type recording apparatus in which a tape cassette is inserted into a cassette compartment and a cassette compartment lid is closed to wrap a magnetic tape drawn from said tape cassette around a tape guide drum thus a recording and/or reproducing becomes possible comprising:
    (a) lock lever means for locking said cassette compartment lid at said closed position;
    (b) timer programming means for programming various kinds of timer-activated contents such as activated day, hour, channels and so on;
    (c) system control circuit means supplied with a first signal indicative of carrying out a timer-activated recording from said timer programming means;
    (d) means for detecting that said tape cassette is inserted into said tape cassette compartment and for supplying a second signal to said system control circuit means; and
    (e) means for generating a third signal which releases a locking state of said lock lever means for said cassette compartment lid by said system control circuit means if said second signal is absent when said first signal is supplied to said system control circuit means whereby said cassette comportment lid is automatically opened if said tape cassette is not inserted into said cassette compartment.

2. The cassette type recording apparatus according to claim 1, in which said timer programming means includes at least select buttons for setting turn-on day, turn-on hour and televsion channels and a timer recording starting or activating button for keeping said recording apparatus on standby mode, said first signal being generated after said timer recording starting button is pressed.

3. The cassette type recording apparatus according to claim 2, in which said timer recording day, hour and television channel can be altered only after said timer recording button is pressed once.

4. The cassette type recording apparatus according to claim 1, further comprising an opening portion formed through the front side thereof and through which said tape cassette is inserted and in which said cassette compartment lid is rotated so as to close said opening portion, said tape cassette is loaded in the horizontal direction from said opening portion, then lowered in the vertical direction and set in the recording condition, wherein under this condition, said tape cassette is hidden from the outside of said opening portion.

* * * * *